US012799361B2

(12) United States Patent
Jang et al.

(10) Patent No.: US 12,799,361 B2
(45) Date of Patent: Nov. 17, 2026

(54) CMP SLURRY COMPOSITION FOR POLISHING TUNGSTEN AND METHOD OF POLISHING TUNGSTEN USING THE SAME

(71) Applicant: SAMSUNG SDI CO., LTD., Yongin-si (KR)

(72) Inventors: Keun Sam Jang, Suwon-si (KR); Won Jung Kim, Suwon-si (KR); Tae Won Park, Suwon-si (KR); Ji Ho Lee, Suwon-si (KR); Eui Rang Lee, Suwon-si (KR); Jin Gyo Kim, Suwon-si (KR); Dong Hyeon Lee, Suwon-si (KR); Chang Suk Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 381 days.

(21) Appl. No.: 18/383,226

(22) Filed: Oct. 24, 2023

(65) Prior Publication Data

US 2024/0174890 A1 May 30, 2024

(30) Foreign Application Priority Data

Nov. 3, 2022 (KR) ........................ 10-2022-0145499

(51) Int. Cl.
*C09G 1/02* (2006.01)
*B24B 37/04* (2012.01)
*C09K 3/14* (2006.01)

(52) U.S. Cl.
CPC .............. *C09G 1/02* (2013.01); *B24B 37/044* (2013.01); *C09K 3/1436* (2013.01)

(58) Field of Classification Search
CPC ...... C09G 1/02; B24B 37/044; C09K 3/1436; C09K 3/14; C23F 3/04; C23F 3/06; H01L 21/3212; H01L 21/30625
See application file for complete search history.

(56) References Cited

U.S. PATENT DOCUMENTS

| | | | | |
|---|---|---|---|---|
| 10,351,809 | B2 * | 7/2019 | Thomas | B08B 3/08 |
| 11,085,011 | B2 * | 8/2021 | Thomas | C11D 3/2068 |
| 2002/0081853 | A1 * | 6/2002 | Beitel | C23F 3/00 438/692 |
| 2007/0093182 | A1 * | 4/2007 | Kollodge | C09K 3/1463 451/41 |
| 2011/0262351 | A1 * | 10/2011 | Chung | A61K 49/0021 534/10 |
| 2017/0065730 | A1 * | 3/2017 | Seo | A61K 51/088 |
| 2017/0119913 | A1 * | 5/2017 | Osterkamp | A61K 47/68 |
| 2017/0190936 | A1 | 7/2017 | Dockery et al. | |
| 2018/0291309 | A1 * | 10/2018 | Frye | C11D 3/0073 |
| 2019/0119523 | A1 * | 4/2019 | Tamada | B24B 1/005 |
| 2019/0382619 | A1 * | 12/2019 | Shi | C09G 1/02 |
| 2020/0071642 | A1 * | 3/2020 | Thomas | C11D 3/2068 |
| 2021/0230451 | A1 | 7/2021 | Kim et al. | |
| 2022/0025214 | A1 | 1/2022 | Lee et al. | |
| 2022/0112401 | A1 | 4/2022 | Kim et al. | |
| 2022/0127495 | A1 * | 4/2022 | Hwang | C09G 1/02 |
| 2022/0298382 | A1 | 9/2022 | Lee et al. | |
| 2023/0099612 | A1 | 3/2023 | Kamimura | |

FOREIGN PATENT DOCUMENTS

| | | | | |
|---|---|---|---|---|
| JP | 2000515685 | A * | 11/2000 | H01L 21/306 |
| JP | 2022-064862 | A | 4/2022 | |
| KR | 10-2000-0029749 | A | 5/2000 | |
| KR | 10-2007-0047020 | A | 5/2007 | |
| KR | 10-2021-0121954 | A | 10/2021 | |
| KR | 10-2022-0049424 | A | 4/2022 | |
| TW | 202118840 | A | 5/2021 | |
| TW | 202128946 | A | 8/2021 | |
| TW | 202204545 | A | 2/2022 | |
| TW | 202214794 | A | 4/2022 | |
| WO | WO 2021/086015 | A1 | 5/2021 | |
| WO | WO 2021/210310 | A1 | 10/2021 | |

OTHER PUBLICATIONS

JP-2000515685-A, Machine Translation. (Year: 2026).*
Taiwanese Notice of Allowance issued on Sep. 24, 2024, in the corresponding Taiwanese Patent Application No. 112142132.
Japanese Office action dated Nov. 11, 2024.
Korean Notice of Allowance dated May 7, 2026.
Chinese Office action dated Aug. 3, 2026.

* cited by examiner

*Primary Examiner* — Binh X Tran
*Assistant Examiner* — Christopher Remavege
(74) *Attorney, Agent, or Firm* — Lee IP Law, P.C.

(57) ABSTRACT

A CMP slurry composition for polishing tungsten and a method of polishing tungsten using the same, the composition includes a polar solvent or a nonpolar solvent; an abrasive agent; and a compound represented by Formula 3 or a complex thereof:

[Formula 3]

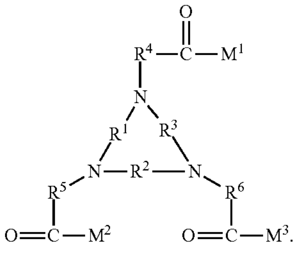

20 Claims, No Drawings

CMP SLURRY COMPOSITION FOR POLISHING TUNGSTEN AND METHOD OF POLISHING TUNGSTEN USING THE SAME

CROSS-REFERENCE TO RELATED APPLICATION

The present application claims priority to and the benefit of Korean Patent Application No. 10-2022-0145499, filed on Nov. 3, 2022, in the Korean Intellectual Property Office, the entire disclosure of which is incorporated herein by reference.

1. FIELD

Embodiments relate to a CMP slurry composition for polishing tungsten and a method of polishing tungsten using the same.

2. DESCRIPTION OF THE RELATED ART

Methods and chemical mechanical polishing (CMP) compositions may be used for polishing (or planarizing) a surface of a substrate.

A process of polishing a metal layer using a CMP composition may include polishing an initial metal layer, polishing the metal layer and a barrier layer, and polishing the metal layer, the barrier layer, and an oxide film. In the polishing of the metal layer, the barrier layer, and the oxide film, a polishing composition for polishing patterned tungsten wafers may be used.

SUMMARY

The embodiments may be realized by providing a CMP slurry composition for polishing tungsten, the composition including a polar solvent or a nonpolar solvent; an abrasive agent; and a compound represented by Formula 3 or a complex thereof:

[Formula 3]

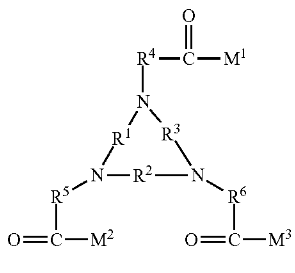

wherein, in Formula 3, $R^1$, $R^2$, and $R^3$ are each independently a single bond or a substituted or unsubstituted $C_1$ to $C_3$ alkylene group, $R^4$, $R^5$, and $R^6$ are each independently a substituted or unsubstituted $C_1$ to $C_3$ alkylene group, and $M^1$, $M^2$, and $M^3$ are each independently OH or $O^-M^+$, $M^+$ being a monovalent cation.

The compound represented by Formula 3 may be a compound represented by Formula 3-1 or a salt thereof with an alkali metal cation:

[Formula 3-1]

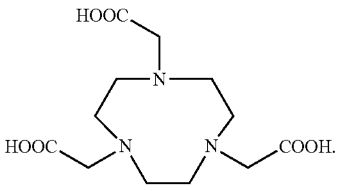

The composition may include the complex of the compound represented by Formula 3, and the complex may be formed by coordination bonding of the compound represented by Formula 3 to a metal ion.

The metal ion may be a divalent iron cation ($Fe^{2+}$) or a trivalent iron cation ($Fe^{3+}$).

The composition may include the complex of the compound represented by Formula 3, and the complex may be a complex represented by Formula 4:

[Formula 4]

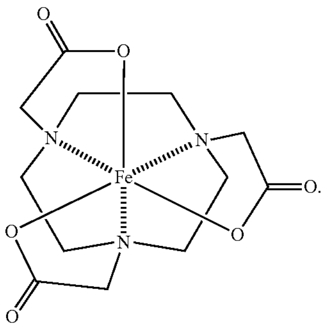

The compound represented by Formula 3 or the complex thereof may be included in the composition in an amount of 0.001 wt % to 10 wt %, based on a total weight of the composition.

The abrasive agent may include an unmodified abrasive agent or a modified abrasive agent.

The abrasive agent may include the modified abrasive agent, and the modified abrasive agent may include silica modified with an amino silane containing 1 to 5 nitrogen atoms.

The CMP slurry composition may further include an oxidant, an amino acid, or an organic acid.

The composition may include 0.001 wt % to 20 wt % of the abrasive agent, 0.001 wt % to 10 wt % of the compound represented by Formula 3 or the complex thereof, 0.001 wt % to 10 wt % of the organic acid, 0.001 wt % to 10 wt % of the amino acid, and 30 wt % to 99 wt % of the solvent, all wt % being based on a total weight of the composition.

The composition may have a pH of 2 to 7.

The embodiments may be realized by providing a method of polishing tungsten, the method comprising polishing tungsten using the CMP slurry composition for polishing tungsten according to an embodiment.

The compound represented by Formula 3 may be a compound represented by Formula 3-1 or a salt thereof with an alkali metal cation:

[Formula 3-1]

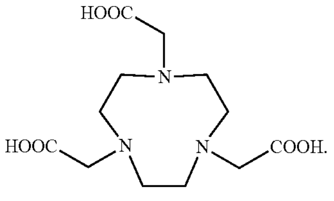

The composition may include the complex of the compound represented by Formula 3, and the complex may be formed by coordination bonding of the compound represented by Formula 3 to a metal ion.

The metal ion may be a divalent iron cation ($Fe^{2+}$) or a trivalent iron cation ($Fe^{3+}$).

The composition may include the complex of the compound represented by Formula 3, and the complex may be a complex represented by Formula 4:

[Formula 4]

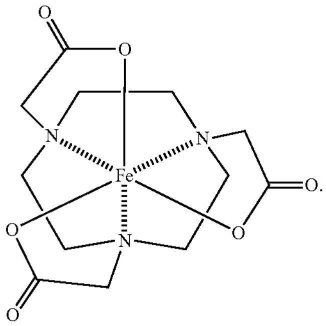

The abrasive agent may include a modified abrasive agent, and the modified abrasive agent may include silica modified with an amino silane containing 1 to 5 nitrogen atoms.

The CMP slurry composition may further include an oxidant, an amino acid, or an organic acid.

The composition may include 0.001 wt % to 20 wt % of the abrasive agent, 0.001 wt % to 10 wt % of the compound represented by Formula 3 or the complex thereof, 0.001 wt % to 10 wt % of the organic acid, 0.001 wt % to 10 wt % of the amino acid, and 30 wt % to 99 wt % of the solvent, all wt % being based on a total weight of the composition.

The composition may have a pH of 2 to 7.

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey exemplary implementations to those skilled in the art.

It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. As used herein, the term "or" is not necessarily an exclusive term, e.g., "A or B" would include A, B, or A and B.

The terminology used herein is for the purpose of describing exemplary embodiments and is not intended to limit the present application. As used herein, the singular forms, "a", "an", and "the" are intended to include the plural forms as well, unless the context clearly indicates otherwise.

As used herein, the term "substituted" in the expression "substituted or unsubstituted" means that at least one hydrogen atom in a corresponding functional group is substituted with one selected from among a hydroxyl group, a $C_1$ to $C_{20}$ alkyl group or haloalkyl group, a $C_2$ to $C_{20}$ alkenyl group or haloalkenyl group, a $C_2$ to $C_{20}$ alkynyl group or haloalkynyl group, a $C_3$ to $C_{20}$ cycloalkyl group, a $C_3$ to $C_{20}$ cycloalkenyl group, a $C_6$ to $C_{20}$ aryl group, a $C_7$ to $C_{20}$ arylalkyl group, a $C_1$ to $C_{20}$ alkoxy group, a $C_6$ to $C_{20}$ aryloxy group, an amino group, a halo group, a cyano group, or a thiol group.

As used herein, a "monovalent aliphatic hydrocarbon group" may be a substituted or unsubstituted $C_1$ to $C_{20}$ linear or branched alkyl group, preferably a $C_1$ to $C_{10}$ alkyl group, more preferably a $C_1$ to $C_5$ alkyl group.

As used herein, a "monovalent alicyclic hydrocarbon group" may be a substituted or unsubstituted $C_3$ to $C_{20}$ cycloalkyl group, preferably a $C_3$ to $C_{10}$ cycloalkyl group, more preferably a $C_3$ to $C_5$ cycloalkyl group.

As used herein, a "monovalent aromatic hydrocarbon group" may include a substituted or unsubstituted $C_6$ to $C_{20}$ aryl group or a substituted or unsubstituted $C_7$ to $C_{20}$ arylalkyl group, preferably a $C_6$ to $C_{10}$ aryl group or a $C_7$ to $C_{10}$ arylalkyl group.

As used herein, a "divalent aliphatic hydrocarbon group", a "divalent alicyclic hydrocarbon group", or a "divalent aromatic hydrocarbon group" may be obtained by transforming the "monovalent aliphatic hydrocarbon group", the "monovalent alicyclic hydrocarbon group", or the "monovalent aromatic hydrocarbon group" into a divalent form.

For example, the "divalent aliphatic hydrocarbon group" may be a substituted or unsubstituted $C_1$ to $C_{20}$ linear or branched alkylene group, preferably a $C_1$ to $C_{10}$ alkylene group, more preferably a $C_1$ to $C_5$ alkylene group; the "divalent alicyclic hydrocarbon group" may be a substituted or unsubstituted $C_3$ to $C_{20}$ cycloalkylene group, preferably a $C_3$ to $C_{10}$ cycloalkylene group, more preferably a $C_3$ to $C_5$ cycloalkylene group; and the "divalent aromatic hydrocarbon group" may be a substituted or unsubstituted $C_6$ to $C_{20}$ arylene group or a substituted or unsubstituted $C_7$ to $C_{20}$ arylalkylene group, preferably a $C_6$ to $C_{20}$ arylene group or a $C_6$ to $C_{10}$ arylalkylene group.

As used herein to represent a specific numerical range, the expression "X to Y" means "greater than or equal to X and less than or equal to Y".

Embodiments relate to a CMP slurry composition for polishing tungsten. The CMP slurry composition according to an embodiment may polish tungsten at a high polishing rate and may help improve flatness of a polished surface through reduction in surface defects such as erosion. In an implementation, the composition may be used to polish a patterned tungsten wafer, and the composition may polish an oxide film on the wafer at a high polishing rate and may help ensure improved flatness of a polished surface through reduction in surface defects such as erosion.

The CMP slurry composition for polishing tungsten according to an embodiment (hereinafter referred to as a "CMP slurry composition") may include, e.g., a polar solvent or a nonpolar solvent; an abrasive agent; and a compound represented by Formula 3 or a complex thereof.

Solvent

The polar or nonpolar solvent may help reduce friction upon polishing tungsten or a patterned tungsten wafer with the abrasive agent. The polar or nonpolar solvent may include, e.g., water (e.g., ultrapure water or deionized water), organic amines, organic alcohols, organic alcohol amines, organic ethers, organic ketones, or the like. In an implementation, the solvent may include ultrapure water or deionized water. In an implementation, the solvent may be present in the balance amount, e.g., in an amount of 30 wt % to 99 wt %, based on a total weight of the CMP slurry composition.

Abrasive Agent

The abrasive agent may facilitate polishing of an insulating film (e.g., a silicon oxide film) and a patterned tungsten wafer at a high polishing rate.

The abrasive agent may include a metal oxide abrasive, e.g., silica (such as colloidal silica or fumed silica), ceria, alumina, or the like. In an implementation, the abrasive agent may include colloidal silica or fumed silica. In an implementation, the abrasive agent may include colloidal silica.

The abrasive agent may include spherical or non-spherical particles and may have an average primary particle diameter ($D_{50}$) of 10 nm to 200 nm, e.g., 20 nm to 180 nm, or 30 nm to 150 nm. Within these ranges, the abrasive agent may help polish an insulating film and a patterned tungsten wafer, which are polishing objects herein, at a high polishing rate. As used herein, "average particle diameter ($D_{50}$)" refers to a particle diameter corresponding to 50% by volume in a volume cumulative distribution of the abrasive agent particles.

The abrasive agent may include an unmodified abrasive agent or a modified abrasive agent. In an implementation, the abrasive agent may be a modified abrasive agent, and the CMP slurry composition may achieve an improved polishing rate with respect to an insulating film and reduction in scratches, and may achieve a high polishing rate with respect to a patterned tungsten wafer even at a pH in the slightly acidic range, which is higher than that of another strongly acidic CMP slurry composition.

In an implementation, the modified abrasive agent may be an abrasive agent modified with silane containing at least one nitrogen atom alone and may be positively charged on the surface thereof. In an implementation, the modified abrasive agent may have a surface zeta potential of +10 mV to +100 mV, e.g., +20 mV to +60 mV. Within these ranges, the modified abrasive agent may help to improve a polishing rate with respect to an insulating film.

In an implementation, the modified abrasive agent may be prepared by adding an amino silane containing at least one nitrogen atom to an unmodified abrasive agent in a molar ratio of 0.02:1 to 1:1 with respect to the unmodified abrasive agent under acidic conditions, followed by stirring at 50° C. to 80° C. for 10 to 30 hours. In an implementation, the acidic conditions may be achieved by adding an acid, e.g., hydrochloric acid, hydrofluoric acid, acetic acid, nitric acid, or sulfuric acid. In an implementation, the unmodified abrasive agent may include colloidal silica or fumed silica. In an implementation, the unmodified abrasive agent may include colloidal silica.

In an implementation, the abrasive agent may be an abrasive agent modified with an amino silane containing at least one nitrogen atom, e.g., 1 to 5 nitrogen atoms. In an implementation, the abrasive agent may be an abrasive agent modified with at least one selected from among an amino silane containing two nitrogen atoms and an amino silane containing three nitrogen atoms described below.

Silane Containing Two Nitrogen Atoms

The silane containing two nitrogen atoms may include a compound represented by Formula 1, a cation derived from the compound represented by Formula 1, or a salt of the compound represented by Formula 1.

[Formula 1]

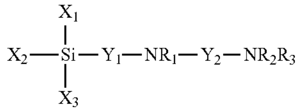

In Formula 1, $X_1$, $X_2$, and $X_3$ may each independently be or include, e.g., hydrogen, a hydroxyl group, a substituted or unsubstituted $C_1$ to $C_{20}$ alkyl group, a substituted or unsubstituted $C_6$ to $C_{20}$ aryl group, a substituted or unsubstituted $C_3$ to $C_{20}$ cycloalkyl group, a substituted or unsubstituted $C_7$ to $C_{20}$ arylalkyl group, a substituted or unsubstituted $C_1$ to $C_{20}$ alkoxy group, or a substituted or unsubstituted $C_6$ to $C_{20}$ aryloxy group.

In an implementation, at least one of $X_1$, $X_2$, and $X_3$ may be, e.g., a hydroxyl group, a substituted or unsubstituted $C_1$ to $C_{20}$ alkoxy group, or a substituted or unsubstituted $C_6$ to $C_{20}$ aryloxy group.

$Y_1$ and $Y_2$ may each independently be or include, e.g., a single bond, a divalent aliphatic hydrocarbon group, a divalent alicyclic hydrocarbon group, or a divalent aromatic hydrocarbon group.

$R_1$, $R_2$, and $R_3$ may each independently be or include, e.g., hydrogen, a hydroxyl group, a substituted or unsubstituted $C_1$ to $C_{20}$ monovalent aliphatic hydrocarbon group, a substituted or unsubstituted $C_3$ to $C_{20}$ monovalent alicyclic hydrocarbon group, or a substituted or unsubstituted $C_6$ to $C_{20}$ monovalent aromatic hydrocarbon group.

In an implementation, the abrasive agent may include an abrasive agent modified with the compound represented by Formula 1.

In an implementation, in Formula 1, $X_1$, $X_2$, and $X_3$ may each independently be, e.g., a hydroxyl group, a substituted or unsubstituted $C_1$ to $C_{20}$ alkyl group, or a substituted or unsubstituted $C_1$ to $C_{20}$ alkoxy group. In an implementation, at least one of $X_1$, $X_2$, and $X_3$ may be, e.g., a hydroxyl group or a substituted or unsubstituted $C_1$ to $C_{20}$ alkoxy group. In an implementation, in Formula 1, $X_1$, $X_2$, and $X_3$ may each independently be, e.g., a hydroxyl group or a substituted or unsubstituted $C_1$ to $C_{20}$ alkoxy group. The compound represented by Formula 1 may be more stably bonded to the abrasive agent, thereby increasing lifespan of the abrasive agent.

In an implementation, $Y_1$ and $Y_2$ may each independently be, e.g., a divalent aliphatic hydrocarbon group, more preferably a $C_1$ to $C_5$ alkylene group.

In an implementation, in Formula 1, $R_1$, $R_2$, and $R_3$ may each independently be, e.g., hydrogen, such that the compound represented by Formula 1 may be an amino group ($-NH_2$)-containing silane.

In an implementation, the compound represented by Formula 1 may include, e.g., aminoethylaminopropyltrimethoxysilane, aminoethylaminopropyltriethoxysilane, aminoethylaminopropylmethyldimethoxysilane, aminoethylaminopropylmethyldiethoxysilane, aminoethylaminomethyltriethoxysilane, or aminoethylaminomethylmethyldiethoxysilane.

In an implementation, the abrasive agent may include an abrasive agent modified with a cation derived from the compound represented by Formula 1.

The cation derived from the compound represented by Formula 1 refers to a cation formed by additional bonding of hydrogen or a substituent group to at least one of the two nitrogen atoms in Formula 1. The cation may be a monovalent cation or a divalent cation. In an implementation, the cation may be represented by one of Formulas 1-1 to 1-3.

[Formula 1-1]

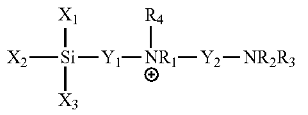

[Formula 1-2]

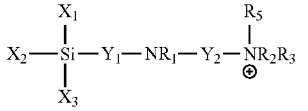

[Formula 1-3]

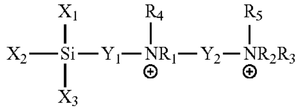

In Formulas 1-1 to 1-3, $X_1$, $X_2$, $X_3$, $Y_1$, $Y_2$, $R_1$, $R_2$, and $R_3$ may each be defined the same as those of Formula 1.

$R_4$ and $R_5$ may each independently be, e.g., hydrogen, a hydroxyl group, a substituted or unsubstituted $C_1$ to $C_{20}$ monovalent aliphatic hydrocarbon group, a substituted or unsubstituted $C_3$ to $C_{20}$ monovalent alicyclic hydrocarbon group, or a substituted or unsubstituted $C_6$ to $C_{20}$ monovalent aromatic hydrocarbon group.

In an implementation, the abrasive agent may include an abrasive agent modified with a salt of the compound represented by Formula 1. The salt of the compound represented by Formula 1 refers to a neutral salt composed of a cation and an anion derived from the compound represented by Formula 1.

The cation may be represented by one of Formulas 1-1 to 1-3. The anion may include a halogen anion (e.g., $F^-$, $Cl^-$, $Br^-$, $I^-$); an organic acid anion, such as a carbonic acid anion (e.g., $CO_3^{2-}$, $HCO_3^-$), an acetic acid anion ($CH_3COO^-$), or a citric acid anion ($HOC(COO^-)(CH2COO^-)_2$); a nitrogen-containing anion (e.g., $NO_3^-$, $NO_2^-$); a phosphorus-containing anion (e.g., $PO_4^{3-}$, $HPO_4^{2-}$, $H_2PO_4^-$); a sulfur-containing anion (e.g., $SO_4^{2-}$, $HSO_4^-$); or a cyanide anion ($CN^-$).

Silane Containing Three Nitrogen Atoms

The silane containing three nitrogen atoms may include a compound represented by Formula 2, a cation derived from the compound represented by Formula 2, or a salt of the compound represented by Formula 2.

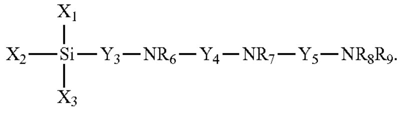

In Formula 2, $X_1$, $X_2$, and $X_3$ may each be defined the same as those of Formula 1.

$Y_3$, $Y_4$, and $Y_5$ may each independently be or include, e.g., a single bond, a divalent aliphatic hydrocarbon group, a divalent alicyclic hydrocarbon group, or a divalent aromatic hydrocarbon group.

$R_6$, $R_7$, $R_8$, and $R_9$ may each independently be, e.g., hydrogen, a hydroxyl group, a substituted or unsubstituted $C_1$ to $C_{20}$ monovalent aliphatic hydrocarbon group, a substituted or unsubstituted $C_3$ to $C_{20}$ monovalent alicyclic hydrocarbon group, or a substituted or unsubstituted $C_6$ to $C_{20}$ monovalent aromatic hydrocarbon group.

In an implementation, the abrasive agent may include an abrasive agent modified with the compound represented by Formula 2.

In an implementation, in Formula 2, $X_1$, $X_2$, and $X_3$ may each independently be, e.g., a hydroxyl group, a substituted or unsubstituted $C_1$ to $C_{20}$ alkyl group, or a substituted or unsubstituted $C_1$ to $C_{20}$ alkoxy group. In an implementation, at least one of $X_1$, $X_2$, and $X_3$ may be, e.g., a hydroxyl group or a substituted or unsubstituted $C_1$ to $C_{20}$ alkoxy group. In an implementation, in Formula 2, $X_1$, $X_2$, and $X_3$ may each independently be, e.g., a hydroxyl group or a substituted or unsubstituted $C_1$ to $C_{20}$ alkoxy group. The compound represented by Formula 2 may be more stably bonded to silica, thereby increasing lifespan of the abrasive agent.

In an implementation, in Formula 2, $Y_3$, $Y_4$ and $Y_5$ may each independently be a divalent aliphatic hydrocarbon group, e.g., a $C_1$ to $C_5$ alkylene group.

In an implementation, in Formula 2, $R_6$, $R_7$, $R_8$, and $R_9$ may each independently be, e.g., hydrogen, such that the compound represented by Formula 2 may be an amino group ($—NH_2$)-containing silane.

In an implementation, the compound represented by of Formula 2 may include, e.g., diethylenetriaminopropyltrimethoxysilane, diethylenetriaminopropyltriethoxysilane, diethylenetriaminopropylmethyldimethoxysilane, diethylenetriaminopropylmethyldiethoxysilane, or diethylenetriaminomethylmethyldiethoxysilane.

In an implementation, the abrasive agent may include an abrasive agent modified with a cation derived from the compound represented by Formula 2.

The cation derived from the compound represented by Formula 2 refers to a cation formed by bonding of hydrogen or a substituent group to the nitrogen atoms in Formula 2. The cation may be a monovalent to trivalent cation. In an implementation, the cation may be represented by one of Formulas 2-1 to 2-7.

[Formula 2-1]

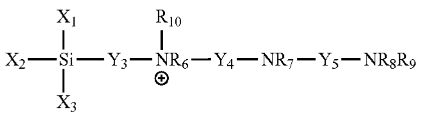

[Formula 2-2]

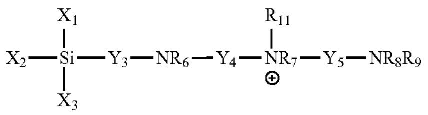

[Formula 2-3]

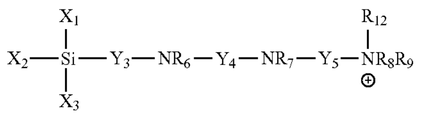

[Formula 2-4]

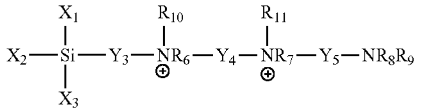

-continued

[Formula 2-5]

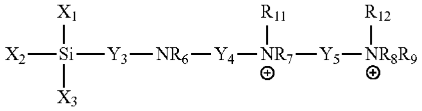

[Formula 2-6]

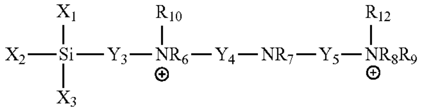

[Formula 2-7]

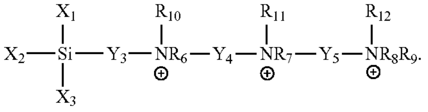

In Formulas 2-1 to 2-7, $X_1$, $X_2$, $X_3$, $Y_3$, $Y_4$, $Y_5$, $R_6$, $R_7$, $R_8$, and $R_9$ may each be defined the same as those of Formula 2.

$R_{10}$, $R_{11}$, and $R_{12}$ may each independently be, e.g., hydrogen, a hydroxyl group, a substituted or unsubstituted $C_1$ to $C_{20}$ monovalent aliphatic hydrocarbon group, a substituted or unsubstituted $C_3$ to $C_{20}$ monovalent alicyclic hydrocarbon group, or a substituted or unsubstituted $C_6$ to $C_{20}$ monovalent aromatic hydrocarbon group.

In an implementation, the abrasive agent may include an abrasive agent modified with a salt of the compound represented by Formula 2. The salt of the compound represented by Formula 2 refers to a neutral salt composed of a cation and an anion derived from the compound represented by Formula 2.

The cation may be represented by one of Formulas 2-1 to 2-7. The anion may be the same as described above related to the salt of the compound represented by Formula 1.

The abrasive agent may be present in an amount of, e.g., 0.001 wt % to 20 wt %, 0.01 wt % to 15 wt %, from 0.05 wt % to 10 wt %, or 0.1 wt % to 5 wt % or 0.5 wt % to 3 wt %, based on a total weight of the CMP slurry composition. Within these ranges, the abrasive agent may help polish an insulating film and a patterned tungsten wafer at a high polishing rate.

Compound Represented by Formula 3 or Complex Thereof

The compound represented by Formula 3 may form a catalyst in the CMP slurry composition. In an implementation, the catalyst may be a complex between the compound represented by Formula 3 and a metal ion.

[Formula 3]

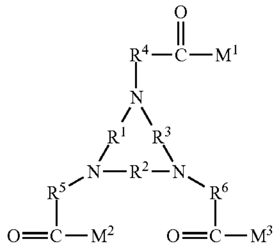

In Formula 3, $R^1$, $R^2$, and $R^3$ may each independently be or include, e.g., a single bond or a substituted or unsubstituted $C_1$ to $C_3$ alkylene group.

$R^4$, $R^5$, and $R^6$ may each independently be or include, e.g., a substituted or unsubstituted $C_1$ to $C_3$ alkylene group.

$M^1$, $M^2$, and $M^3$ may each independently be or include, e.g., OH or $O^-M^+$, in which $M^+$ is a monovalent cation.

The compound represented by Formula 3 has a closed ring structure having three nitrogen atoms. In an implementation, the compound represented by Formula 3 has a total of three —C(═O)M″ moieties (M″ being $M^1$, $M^2$, or $M^3$), each of which is attached to a respective one of the three nitrogen atoms. In an implementation, the compound represented by Formula 3 may form a complex with a metal ion, all of the three —C(═O)M″ moieties (M″ being $M^1$, $M^2$, or $M^3$) of the compound represented by Formula 3 may be bonded to the metal ion, with no —C(═O)M″ moieties (M″ being $M^1$, $M^2$, or $M^3$) remaining unbonded to the metal ion, and the three nitrogen atoms in Formula 3 may also be bonded to the metal ion, thereby significantly improving stability of the catalyst. The CMP slurry composition according to an embodiment may help polish a patterned tungsten wafer at a high polishing rate while improving flatness of a polished surface.

In an implementation, in Formula 3, $R^1$, $R^2$, and $R^3$ may each independently be, e.g., a substituted or unsubstituted $C_2$ to $C_3$ alkylene group, $R^4$, $R^5$, and $R^6$ may each independently be, e.g., a substituted or unsubstituted $C_1$ to $C_2$ alkylene group, and $M^1$, $M^2$, and $M^3$ may each independently be, e.g., OH.

In an implementation, in Formula 3, the monovalent cation may be an alkali metal cation, e.g., $Li^+$, $Na^+$, or $K^+$.

In an implementation, the compound represented by Formula 3 may be a compound represented by Formula 3-1 or a salt thereof with an alkali metal cation.

[Formula 3-1]

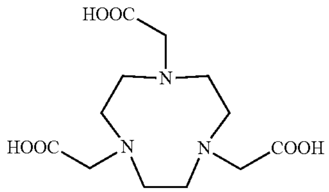

The complex of the compound represented by Formula 3 may be a complex formed by coordination bonding of the compound represented by Formula 3 to a metal ion. In an implementation, the metal ion may be an iron ion, e.g., a divalent iron cation ($Fe^{2+}$) or a trivalent iron cation ($Fe^{3+}$). In an implementation, the compound represented by Formula 3 may form a complex, and the compound represented by Formula 3 may be bonded to the metal ion with H or $M^+$ detached from $M^1$, $M^2$, and $M^3$ thereof.

In an implementation, the complex of the compound represented by Formula 3 may be, e.g., a complex represented by Formula 4. Referring to Formula 4, the three nitrogen atoms and the three —C(═O)M″ moieties (M″ being $m^1$, $M^2$, or $M^3$) may be bonded to Fe.

[Formula 4]

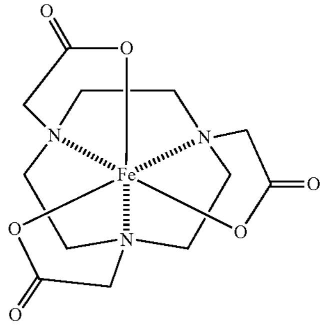

The metal ion may be derived from a divalent iron cation-containing compound, a trivalent iron cation-containing compound, or hydrates thereof. In an implementation, such a compound may include, e.g., iron chloride ($FeCl_3$), iron nitrate ($Fe(NO_3)_3$), iron sulfate ($Fe_2(SO_4)_3$), or hydrates thereof.

The complex of the compound represented by Formula 3 may be formed by chelation bonding of the compound represented by Formula 3 to a trivalent iron cation-containing compound or a hydrate thereof.

The compound represented by Formula 3 or the complex thereof may be present in an amount of, e.g., 0.001 wt % to 10 wt %, 0.001 wt % to 1 wt %, 0.001 wt % to 0.5 wt %, 0.001 wt % to 0.1 wt %, or 0.001 wt % to 0.01 wt %, based on a total weight of the CMP slurry composition. Within these ranges, the compound represented by Formula 3 or the complex may help improve a polishing rate with respect to a tungsten film while improving flatness of a polished surface.

The CMP slurry composition may further include, e.g., an oxidant, an amino acid, or an organic acid (e.g., different from the amino acid).

The oxidant may facilitate polishing of a patterned tungsten wafer by oxidizing the patterned tungsten wafer.

The oxidant may include, e.g., an inorganic per-compound, an organic per-compound, bromic acid or a salt thereof, nitric acid or a salt thereof, chloric acid or a salt thereof, chromic acid or a salt thereof, iodic acid or a salt thereof, iron or a salt thereof, copper or a salt thereof, a rare earth metal oxide, a transition metal oxide, or potassium dichromate. Herein, "per-compound" refers to a compound containing at least one peroxide group (—O—O—) or containing an element in the highest oxidation state. In an implementation, the oxidant may be, e.g., a per-compound. In an implementation, the per-compound may include, e.g., hydrogen peroxide, potassium periodate, calcium persulfate, or potassium ferricyanide. In an implementation, the per-compound may be, e.g., hydrogen peroxide.

The oxidant may be present in an amount of, e.g., 0.01 wt % to 20 wt %, 0.05 wt % to 10 wt %, or 0.1 wt % to 5 wt %, based on a total weight of the CMP slurry composition. Within these ranges, the oxidant may help improve a polishing rate with respect to a patterned tungsten wafer.

The amino acid may be included in the CMP slurry composition including the abrasive agent described above to further improve a polishing rate with respect to tungsten.

The amino acid may include, e.g., glycine, lysine, alanine, histidine, serine, glutamine, valine, leucine, phenylalanine, arginine, aspartic acid, glutamic acid, threonine, asparagine, cysteine, proline, or the like. In an implementation, the amino acid may include, e.g., glycine, lysine, alanine, or histidine. In an implementation, the amino acid may include, e.g., glycine.

The amino acid may be present in an amount of, e.g., 0.001 wt % to 10 wt %, 0.005 wt % to 5 wt %, 0.01 wt % to 1 wt %, or 0.02 wt % to 0.5 wt %, based on a total weight of the CMP slurry composition. Within these ranges, the amino acid may help improve a polishing rate with respect to a tungsten film.

The organic acid may help improve a polishing rate with respect to a patterned tungsten wafer.

The organic acid may include an organic acid having at least one carboxyl group, e.g., an organic acid having one carboxyl group. In an implementation, the organic acid may include, e.g., acetic acid, propionic acid, butyric acid, or valeric acid.

The organic acid may be present in an amount of, e.g., 0.001 wt % to 10 wt %, 0.002 wt % to 5 wt %, 0.005 wt % to 3 wt %, or 0.01 wt % to 1 wt %, based on a total weight of the CMP slurry composition. Within these ranges, the organic acid may help improve dispersion stability of the abrasive agent, thereby ensuring that there will be no clumping or agglomeration of the abrasive agent even after a long time from preparation of the CMP slurry composition.

The CMP slurry composition may have a pH of, e.g., 2 to 7. By using the modified silica described above as the abrasive agent, the CMP slurry composition according to an embodiment may achieve a high polishing rate with respect to a patterned tungsten wafer even at a pH in the slightly acidic range, which is higher than that of a typical strongly acidic CMP slurry composition. In an implementation, the CMP slurry composition may have a pH of, e.g., 2 to 6, 3 to 6, 4 to 6, or 5 to 6.

In an implementation, the CMP slurry composition may further include, e.g., a trivalent iron cation-containing compound or a hydrate thereof. In an implementation, the CMP slurry composition may further include, e.g., iron chloride ($FeCl_3$), iron nitrate ($Fe(NO_3)_3$), iron sulfate ($Fe_2(So_4)_3$), or hydrates thereof.

The trivalent iron cation-containing compound or the hydrate thereof may be present in an amount of, e.g., 0.001 wt % to 10 wt %, 0.01 wt % to 1 wt %, or 0.1 wt % to 0.5 wt %, based on a total weight of the CMP slurry composition. Within these ranges, the trivalent iron cation-containing compound or the hydrate thereof may help ensure improved catalytic activity and stability, thereby maximizing polishing performance of the CMP slurry composition.

In an implementation, the CMP slurry composition may further include a pH adjuster to adjust the pH of the CMP slurry composition within the range set forth above.

The pH adjuster may include an inorganic acid, e.g., nitric acid, phosphoric acid, hydrochloric acid, or sulfuric acid. In an implementation, the pH adjuster may include a base, e.g., aqueous water, sodium hydroxide, potassium hydroxide, ammonium hydroxide, sodium carbonate, or potassium carbonate.

In an implementation CMP slurry composition may further include an additive, e.g., a biocide, a surfactant, a dispersant, or a modifier. The additive may be present in an amount of, e.g., 0.001 wt % to 5 wt %, 0.002 wt % to 1 wt %, or 0.005 wt % to 0.5 wt %, based on a total weight of the CMP slurry composition. Within these ranges, the additives may help provide desired effects thereof without affecting a polishing rate with respect to a polishing object.

A method of polishing tungsten according to an embodiment may include polishing tungsten using the CMP slurry composition described herein. In an implementation, the method may be used as a method of polishing a patterned tungsten wafer, and may include polishing a patterned tungsten wafer using the CMP slurry composition according to an embodiment.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparative Example 1

A compound represented by Formula 5 (EDPS, Momentive Technologies) was added dropwise to colloidal silica having an average particle diameter of 70 nm (PL3, Fuso Chemical) in a molar ratio of 0.04:1 with respect to the colloidal silica under acidic conditions, followed by reaction at a pH of 3.8 and a temperature of 65° C. for 8 hours, thereby preparing silica modified with the compound represented by Formula 5 (zeta potential: +25 mV, average particle diameter: 70 nm). The zeta potential was measured using a Zetasizer ZS (Malvern Instruments, Inc.).

[Formula 5]

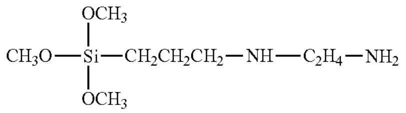

Example 1

0.5 mmol of the compound represented by Formula 3-1 was mixed with 0.5 mmol of iron chloride ($FeCl_3$), followed by refluxing of the mixture and reaction for 24 hours, thereby forming the complex represented by Formula 4. Thereafter, a CMP slurry composition was prepared by mixing 1.2 wt % of the modified silica prepared in Preparative Example 1 as an abrasive agent, 0.001 wt % of the complex represented by Formula 4, 300 ppm of acetic acid as an organic acid, 0.16 wt % of glycine as an amino acid, and the balance of deionized water, based on the total weight of the CMP slurry composition. The CMP slurry composition was adjusted to a pH of 5.6 using nitric acid or aqueous ammonia as a pH adjuster.

Examples 2 to 3

CMP slurry compositions were prepared in the same manner as in Example 1 except that the content of the compound represented by Formula 4 was changed as shown in Table 1. In Table 1, "–" means that a corresponding component was not used.

Comparative Example 1

A CMP slurry composition was prepared in the same manner as in Example 1 except that 0.002 wt % of Fe-ethylenediaminetetraacetic acid (EDTA) complex was used instead of the complex represented by Formula 4.

Comparative Example 2

A CMP slurry composition was prepared in the same manner as in Example 1 except that 0.006 wt % of Fe-EDTA complex was used instead of the complex represented by Formula 4.

Comparative Example 3

A CMP slurry composition was prepared in the same manner as in Example 1 except that 0.002 wt % of Fe-diethylenetriamine pentaacetic acid (DTPA) complex was used instead of the complex represented by Formula 4.

Comparative Example 4

A CMP slurry composition was prepared in the same manner as in Example 1 except that 0.006 wt % of Fe-DTPA complex was used instead of the complex represented by Formula 4.

Each of the CMP slurry compositions prepared in Examples 1 to 3 and Comparative Examples 1 to 4 was evaluated as to polishing characteristics under the following polishing evaluation conditions. Results are shown in Table 1.

Polishing Evaluation Conditions

1. Polishing machine: Reflexion LK 300 mm (AMAT Co., Ltd.)
2. Polishing conditions
   Polishing pad: VP3100 (Rohm and Haas Electronic Materials)
   Head speed: 35 rpm
   Platen speed: 33 rpm
   Polishing pressure: 1.5 psi
   Retainer ring pressure: 8 psi
   Slurry flow rate: 250 ml/min
   Polishing time: 60 seconds
3. Polishing object
   A patterned tungsten wafer (MIT 854, 300 mm)
   A CMP slurry for polishing tungsten (STARPLANAR-7000, Samsung SDI Co., Ltd.) was mixed with deionized water in a weight ratio of 1:2, followed by addition of 2 wt % of hydrogen peroxide based on the total weight of the mixture, and then, using the resulting mixture, the patterned tungsten wafer was primarily polished on a polishing machine (Reflexion LK 300 mm) with a polishing pad (IC1010/SubaIV Stacked, Rodel Inc.) for 60 seconds under conditions of: a head speed of 101 rpm; a platen speed of 100 rpm, a polishing pressure of 2.0 psi, a retainer ring pressure of 8 psi, and a mixture flow rate of 240 ml/min. Through this process, a tungsten metal film was removed such that an oxide film/metal pattern was exposed.
4. Oxide film polishing rate (unit: Å/min): After polishing the patterned tungsten wafer under the above polishing conditions, an oxide film polishing rate was calculated by conversion of a difference in film thickness before and after polishing using a reflectometer.
5. Erosion (unit: Å): After polishing the patterned tungsten wafer under the above polishing conditions, the profile of the wafer pattern was measured using an atomic force profiler (InSight CAP, Bruker Co., Ltd.). Erosion was calculated based on a height difference between a peri oxide film and a cell oxide film in a 0.18

μm×0.18 μm patterned area of the polished wafer. Here, a scanning rate was set to 100 μm/sec and a scan length was set to 2 mm.

6. Δ erosion (unit: Å): After polishing the patterned tungsten wafer under the above polishing conditions, a line-space region in a 0.18 μm×0.18 μm patterned area of the polished wafer was scanned once in a contact mode across a total length of 2 mm, 1 mm to each side of the center thereof, followed by calculation of Δ erosion based on a height difference between a tungsten oxide film and a cell oxide film.

7. Protrusion (unit: Å): After polishing the patterned tungsten wafer under the above polishing conditions, a 2 μm×2 μm patterned area was scanned to obtain a 3D image thereof, followed by calculation of protrusion based on height differences on the image.

TABLE 1

| | Formula 4 (wt %) | Fe-EDTA (wt %) | Fe-DTPA (wt %) | Oxide film polishing rate | Erosion | Δ erosion | Protrusion |
|---|---|---|---|---|---|---|---|
| Example 1 | 0.001 | — | — | 820 | 245 | 78 | 91 |
| Example 2 | 0.002 | — | — | 823 | 244 | 80 | 90 |
| Example 3 | 0.006 | — | — | 812 | 270 | 103 | 92 |
| Comparative Example 1 | — | 0.002 | — | 809 | 285 | 141 | 90 |
| Comparative Example 2 | | 0.006 | — | 830 | 293 | 146 | 93 |
| Comparative Example 3 | — | — | 0.002 | 825 | 295 | 140 | 90 |
| Comparative Example 4 | — | — | 0.006 | 838 | 293 | 147 | 93 |

As may be seen in Table 1, the CMP slurry composition according to the Examples, including the closed-ring ligand-containing iron complex represented by Formula 3, reduced erosion while exhibiting comparable properties in terms of polishing rate and protrusion, as compared to the CMP slurry compositions including an open-ring ligand-containing iron complex of the Comparative Examples.

As may be seen in Table 1, when compared to the same amount of an open-ring ligand-containing iron complex such as Fe-EDTA or Fe-DTPA, the closed-ring ligand-containing iron complex reduced Δ erosion by about 20 nm to 50 nm, thereby providing erosion reduction effects. In addition, results of evaluation for different contents of the closed-ring ligand-containing iron complex showed that even a low content of the closed-ring ligand-containing iron complex reduced erosion without causing a reduction in polishing rate with respect to an oxide film.

By way of summation and review, in order to achieve good planarization of a patterned tungsten wafer, the metal layer and the oxide film may be polished at an appropriate polishing rate.

A polishing composition for polishing a metal layer (e.g., tungsten) on a semiconductor substrate may include abrasive particles suspended in an aqueous solution and a chemical accelerator, such as an oxidant and a catalyst. The catalyst may increase a polishing rate with respect to tungsten. There are several types of catalysts available in CMP applications. Some catalysts could cause poor flatness of a polished surface, despite having the ability to increase the polishing rate.

One or more embodiments may provide a CMP slurry composition for polishing tungsten, which may polish tungsten at a high polishing rate and may help improve flatness of a polished surface through reduction in surface defects, such as erosion.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A CMP slurry composition for polishing tungsten, the composition comprising:

a polar solvent or a nonpolar solvent;

an abrasive agent; and a compound represented by Formula 3 or a complex thereof:

[Formula 3]

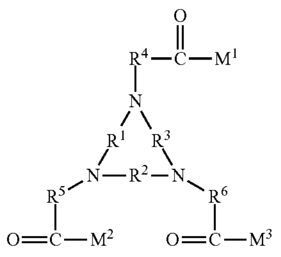

wherein, in Formula 3, $R^1$, $R^2$, and $R^3$ are each independently a single bond or a substituted or unsubstituted $C_1$ to $C_3$ alkylene group, $R^4$, $R^5$, and $R^6$ are each independently a substituted or unsubstituted $C_1$ to $C_3$ alkylene group, and $M^1$, $M^2$, and $M^3$ are each independently OH or $O^-M^+$, $M^+$ being a monovalent cation.

2. The CMP slurry composition according to claim 1, wherein the compound represented by Formula 3 is a compound represented by Formula 3-1 or a salt thereof with an alkali metal cation:

[Formula 3-1]

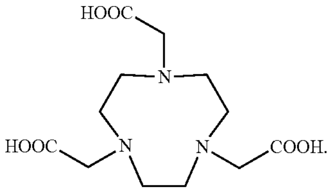

3. The CMP slurry composition according to claim 1, wherein:

the composition includes the complex of the compound represented by Formula 3, and the complex is formed by coordination bonding of the compound represented by Formula 3 to a metal ion.

4. The CMP slurry composition according to claim 3, wherein the metal ion is a divalent iron cation ($Fe^{2+}$) or a trivalent iron cation ($Fe^{3+}$).

5. The CMP slurry composition according to claim 1, wherein:

the composition includes the complex of the compound represented by Formula 3, and the complex is a complex represented by Formula 4:

[Formula 4]

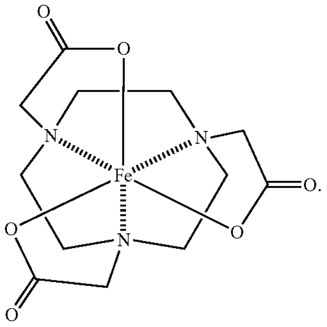

6. The CMP slurry composition according to claim 1, wherein the compound represented by Formula 3 or the complex thereof is included in the composition in an amount of 0.001 wt % to 10 wt %, based on a total weight of the composition.

7. The CMP slurry composition according to claim 1, wherein the abrasive agent includes a modified abrasive agent.

8. The CMP slurry composition according to claim 7, wherein the modified abrasive agent includes silica modified with an amino silane containing 1 to 5 nitrogen atoms.

9. The CMP slurry composition according to claim 1, further comprising an oxidant, an amino acid, or an organic acid.

10. The CMP slurry composition according to claim 9, wherein the composition includes:

0.01 wt % to 20 wt % of the abrasive agent, 0.001 wt % to 10 wt % of the compound represented by Formula 3 or the complex thereof, 0.001 wt % to 10 wt % of the organic acid, 0.001 wt % to 10 wt % of the amino acid, and 30 wt % to 99 wt % of the solvent, all wt % being based on a total weight of the composition.

11. The CMP slurry composition according to claim 1, wherein the composition has a pH of 2 to 7.

12. A method of polishing tungsten, the method comprising polishing tungsten using the CMP slurry composition for polishing tungsten as claimed in claim 1.

13. The method according to claim 12, wherein the compound represented by Formula 3 is a compound represented by Formula 3-1 or a salt thereof with an alkali metal cation:

[Formula 3-1]

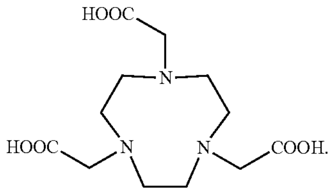

14. The method according to claim 12, wherein:

the composition includes the complex of the compound represented by Formula 3, and the complex is formed by coordination bonding of the compound represented by Formula 3 to a metal ion.

15. The method according to claim 14, wherein the metal ion is a divalent iron cation ($Fe^{2+}$) or a trivalent iron cation ($Fe^{3+}$).

16. The method according to claim 12, wherein:

the composition includes the complex of the compound represented by Formula 3, and the complex is a complex represented by Formula 4:

[Formula 4]

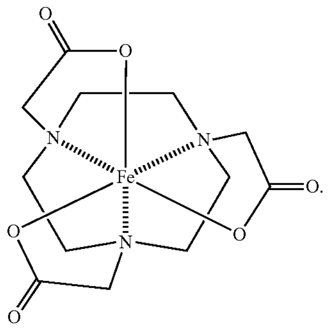

17. The method according to claim 12, wherein:

the abrasive agent includes a modified abrasive agent, and the modified abrasive agent includes silica modified with an amino silane containing 1 to 5 nitrogen atoms.

18. The method according to claim 12, wherein the composition further includes an oxidant, an amino acid, or an organic acid.

19. The method according to claim 18, wherein the composition includes:

0.001 wt % to 20 wt % of the abrasive agent, 0.001 wt % to 10 wt % of the compound represented by Formula 3 or the complex thereof, 0.001 wt % to 10 wt % of the organic acid, 0.001 wt % to 10 wt % of the amino acid, and 30 wt % to 99 wt % of the solvent, all wt % being based on a total weight of the composition.

20. The method according to claim 12, wherein the composition has a pH of 2 to 7.

* * * * *